Patented Apr. 16, 1940

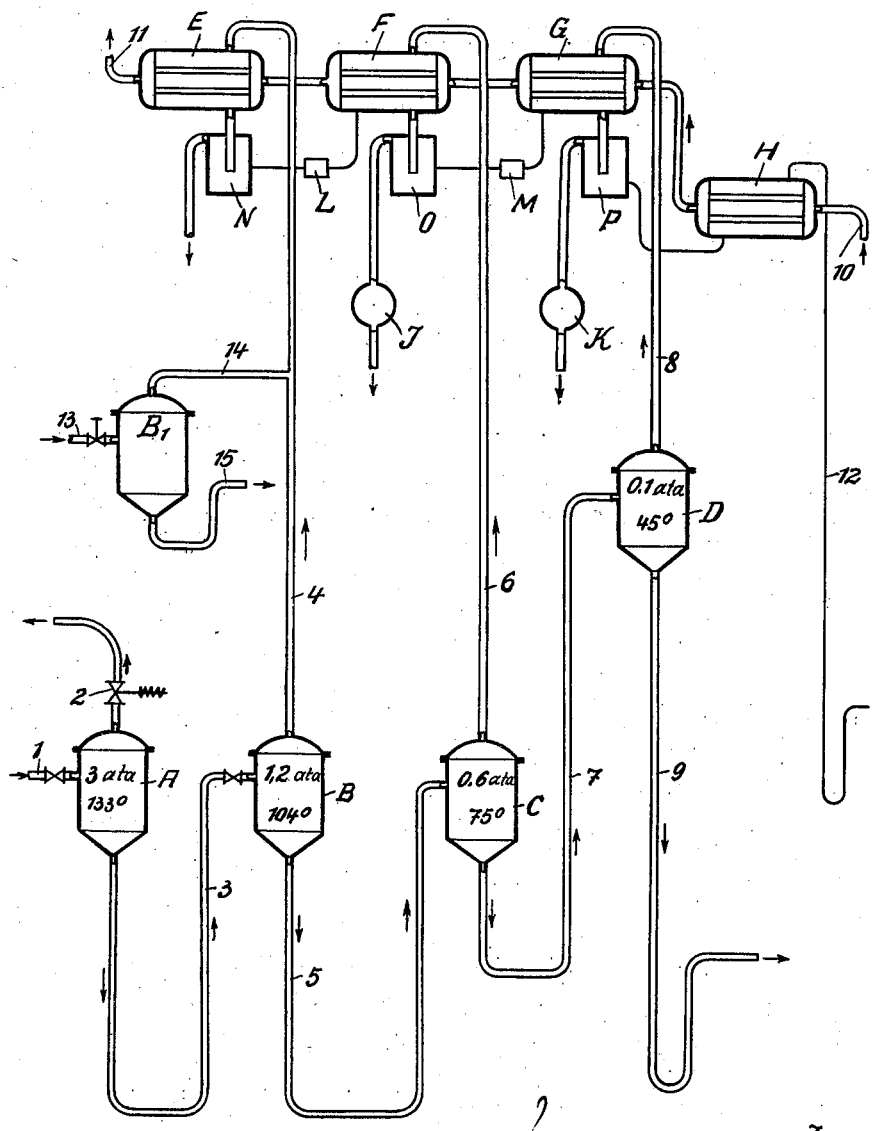

2,197,059

UNITED STATES PATENT OFFICE 2,197,059

APPARATUS FOR AND METHOD OF TRANSFERRING HEAT OF HOT SUGAR WORTS

Max Seidel, Solln, near Munich, Germany

Application July 6, 1938, Serial No. 217,827
In Germany August 6, 1937

13 Claims. (Cl. 127—37)

This invention relates to the saccharification of cellulosic materials. More particularly, it relates to an apparatus for and method of transferring the heat of hot sugar worts.

In the saccharification of wood and other materials containing cellulose by means of dilute acids by the Scholler process (see United States Patent 1,890,304), the resulting hot sugar wort is removed from the reaction vessels (percolators) used for saccharification, at temperatures of, for example, 130° C.–170° C. The liquid employed in the saccharification and extraction of the sugar must be preheated to temperatures above 100° C., the precise adjustment of the temperature of this liquid (water) being regulated automatically by the introduction of steam.

The saccharification process yields different kinds of worts. The portion of the wort yielded first must be subjected to a special after-treatment, whereas the wort yielded later must not be subjected to the conditions of the after-treatment used in connection with the first yielded wort. Therefore, in transferring the heat content of the wood sugar wort leaving the percolators, to the fresh water fed to the percolators, the fresh water had to be divided hitherto into two or more branches and directed to meet the different wort fractions separately. This necessitated special regulating arrangements and constant close supervision of the heat exchange apparatus, since the worts to be cooled had to be suitably cooled to various temperatures. The quantity of wort to be treated further with heat to temperatures near 100° C. and the other amounts of wort to temperatures that must be as low as possible, involved heat exchange operations which were by no means a simple affair. Additionally, the apparatus for transferring heat had a great tendency to form crusts on the side through which the sugar wort passed.

According to the present invention, the transfer of heat from the yielded sugar worts to the fresh water is no longer to be effected by direct heat exchange, but the sugar wort is cooled by reducing the pressure in stages. Since the liquid is at a high or boiling temperature, cooling is effected by evaporation, the liquid being always cooled to the saturated steam temperature corresponding to the pressure that exists. The vapors evolved thereby are condensed and their heat (heat of evaporation) is transferred to the fresh water flowing to the percolators. The expansion may take place in any desired number of stages. As hereafter more fully explained in the illustrative example shown in the annexed drawing, these stages are selected so that at every stage a cooling of the wort by about 30° C is effected.

The accompanying drawing forming a part of this specification illustrates diagrammatically an apparatus adapted to carry out the new process.

Referring now to the drawing, the apparatus therein illustrated comprises expansion vessels A, B, C, D and condensers E, F, G as well as a condensate cooler H. Other accessories are two air pumps I, K and three air excluders N, O, P.

The sugar wort arriving from the percolators enters the expansion vessel A through a pressure-reducing valve 1, whereby its initially high pressure is reduced to three atmospheres and the saturated vapor temperature corresponding to this pressure falls to about 133° C. The vapors evolved in consequence of the expansion and cooling are withdrawn through an overpressure-regulating valve 2 for any desired heating purposes. The overpressure valve 2 maintains a pressure of three atmospheres in the expansion vessel A. Instead of directly removing the vapors leaving the chamber A at 2 and using them for heating purposes, pure water vapor may be produced by condensing these vapors and evaporating water at the same time. The resulting pure water vapor may then be used for corresponding heating purposes, for example, for heating the distilling apparatus. The process described in copending application Serial No. 190,979, filed February 17, 1938 for obtaining or separating dissolved volatile substances from wood sugar wort by rectification under pressure may be combined with the present process. In such a case, the apparatus required for the rectification may replace or be used in conjunction with the expansion vessel A. For the purpose of removing the acid contained in the vapors arising during evaporation, the process of copending application Serial No. 217,828, filed July 6, 1938, can also be combined with the present process.

The wood sugar wort previously cooled in the expansion vessel A to 133° C. passes through the pipe 3 provided with a reducing valve to the expansion vessel B, in which a pressure of 1.2 atmospheres is maintained. A corresponding portion of the wort entering the vessel B then evaporates until, in consequence of the removal of the necessary heat of evaporation, the wort has been cooled to the saturated vapor temperature of about 104° C., which corresponds to the pressure of 1.2 atmospheres. The vapors evolved in the expansion pass through the pipe 4 to the condenser E and are precipitated there.

The wort cooled in the vessel B to 104° C. in consequence of the decrease of pressure now passes through the pipe 5 into the expansion vessel C, in which a pressure of 0.6 atmosphere corresponding to a saturated vapor temperature of 75° C. is maintained. Preferably, the pipe 5 is not provided with a regulating valve. The passage of vapor from the vessel B to the vessel C is prevented by the shape of the pipe 5 which, as shown, is a syphon having an ascending branch of a height of more than 6 meters, so that it is not necessary to supervise the passage of the liquid from the vessel B to the vessel C. The vapor evolved in the vessel C passes through the pipe 6 to the condenser F and there condensed.

The liquid passes from the vessel C to the vessel D in the same manner as it passed from vessel B to vessel C, namely through the syphon pipe 7. The vapors generated in the vessel D pass through the pipe 8 to the condenser G, while the wood sugar wort cooled to 45° C. is discharged through the pipe 9. In the example indicated, the pipe 9 is a barometric down pipe, so that the wort is discharged without the aid of pumps. Of course, in place of the barometric syphon pipe 9 a pump may be used. The height required for the barometric down pipe can be easily obtained by making it possible for the wort, when passing from one of the vessels A, B, C to the respective following vessel (B, C, D), to ascend in consequence of its greater pressure, as is shown for example in the drawing with respect to the passage from the vessel C to the vessel D. A similar higher position may also be arranged for the vessel C with respect to the vessel B, and also, if this should seem to be necessary for any reasons, for vessel B with respect to vessel A.

The fresh water flowing to the saccharification plant is fed by a pump at 10 and passes first through the condensate cooler H and then in succession through the condensers G, F and E, reaching the percolator through the pipe 11. On its passage, it is heated by steps in the condenser G to about 40° C., in the condenser F to about 70° C., and in the condenser E to about 100° C. The exact adjustment of the temperature required for percolation, for example 115° C., is effected by steam in a heating apparatus (not shown in the drawing) located in the pipe 11. If required, part of the steam from the expansion vessel A may also be used for this purpose. The condensate from the condenser E passes by way of an air excluder N to the condensing pot L, in which it expands to the pressure of 0.6 atmosphere obtaining therein, and decreases in temperature from 104° C. to 75° C. while evaporating partly. In the same manner the condensate from the condenser F, together with the condensate coming from the condenser E, is expanded by the air excluder O and the condensing pot M in the condenser G, and there cooled to 45° C. From the condenser G the whole of the condensate of the condensers E, F and G is run off through the air excluder P. Its heat may be used in the condensate cooler H to preheat the fresh water arriving at 10 before it enters the condenser G. The whole of the condensate runs off from the cooler H through the syphon pipe 12 which has the form of a barometric down pipe.

The air from the air excluder N escapes directly into the open air, whereas the air removed from the condensed vapors in the condensers F and G is removed by suction by means of special air pumps I or K. The air excluders N, O, P may also be omitted, the air to be removed then being taken off at a suitable point of the condenser space.

The hitherto described part of the plant may be used immediately if only one kind of wort is produced. Where two kinds of wort are taken from the percolation plant, as described at the beginning of this specification, additional expansion vessels must be provided, and if the additional part to be taken is to be cooled only down to temperatures in the neighborhood of 100° C., an additional expansion vessel $B^1$ is preferably arranged, to which the corresponding part of the wort flows immediately from the percolators through the pipe 13 provided with regulating valves. The vapors arising when pressure is reduced to 1.2 atmospheres escape through the pipe 14 and unite with the vapors coming through the pipe 4 from the expansion vessel B, passing with the latter to the condenser E. The wort fraction cooled in the vessel $B^1$ to 104° C. passes out through the pipe 15 to receive subsequent treatment. If desired, vessel $B^1$ may be preceded by a vessel $A^1$ corresponding to the vessel A. However, this measure can also be omitted, as the worts destined for vessel $B^1$ are yielded with a low pressure and at a lower temperature than the quantities of wort intended for the vessel series A, B, C, D.

Instead of the four-stage expansion of the drawing, an expansion with a smaller or greater number of stages may be used. It is also possible to re-expand and further cool the wort coming from the vessel $B^1$ through the pipe 15 in an additional expansion vessel $C^1$ and further vessels if required. The vapors generated may, in that case, be united with the vapors coming from the expansion vessel C or additional expansion vessels and sent to the corresponding condensers. Besides the series of expansion vessels A, B, C, D and $(A^1)$, $(B^1)$, $(C^1)$, $(D^1)$, additional series of expansion vessels $(A^2)$, $(B^2)$, $(C^2)$, $(D^2)$, etc. may be provided. The references in parentheses indicate corresponding vessels for the vessels A, B, C, D, and are not shown in the drawing.

Since it is obvious that various changes and modifications may be made in the above description without departing from the nature or spirit thereof, this invention is not restricted thereto except as set forth in the appended claims.

I claim:

1. In the Scholler saccharification process wherein dilute acids are percolated through cellulosic substances maintained under heat and pressure, the method of transferring the heat of hot sugar wort to the water used in the percolation operation which comprises separately reducing the pressure on each of a plurality of sugar worts in stages, and condensing together the vapors of each of said sugar worts from the expansion stages of equal pressure with water to be used in the percolation operation, whereby said water is heated.

2. An apparatus for use in the Scholler saccharification process wherein dilute acids are percolated through cellulosic substances maintained under heat and pressure, to transfer the heat of hot sugar wort to water to be used in the percolation operation which comprises a plurality of expansion vessels through which the wort flows successively, whereby the pressure and temperature of the wort are reduced in stages, a plurality of condensers, each condenser being operatively connected to expansion vessels of the same pressure to receive the vapors produced in said expansion vessels, said condensers being positioned in order of the temperature of the vapors received thereby, means to feed water to be used in the percolation operation successively through said condensers in the direction of increasing temperatures, whereby said water is progressively heated and the vapors in the respective condensers condensed, and means to conduct the condensate from one condenser to the next adjacent preceding condenser of lower temperature.

3. An apparatus for use in the Scholler saccharification process wherein dilute acids are percolated through cellulosic substances maintained under heat and pressure, to transfer the heat of hot sugar wort to water to be used in the percolation operation which comprises a plurality of expansion vessels through which the wort flows successively, whereby the pressure and temperature of the wort are reduced in stages, a plurality of condensers, each condenser being operatively connected to expansion vessels of the same pressure to receive the vapors produced in said expansion vessels, said condensers being positioned in the order of the temperature of the vapors received thereby, means to feed water to be used in the percolation operation through said condensers, whereby said water is progressively heated and the vapors in the respective condensers condensed, means to reduce the pressure of the condensate of a condenser to approximately that of the condenser next preceding thereto, and means to conduct the vapors resulting from reducing the pressure of the condensate to the said condenser next preceding.

4. An apparatus for use in the Scholler saccharification process wherein dilute acids are percolated through cellulosic substances maintained under heat and pressure, to transfer the heat of hot sugar wort to water to be used in the percolation operation which comprises a plurality of expansion vessels through which the wort flows successively, whereby the pressure and temperature of the wort are reduced in stages, a plurality of condensers, each condenser being operatively connected to expansion vessels of the same pressure to receive the vapors produced in said expansion vessels, said condensers being positioned in the order of the temperature of the vapors received thereby, means to feed water to be used in the percolation operation through said condensers, whereby said water is progressively heated and the vapors in the respective condensers condensed, means to reduce the pressure of the condensate of a condenser to approximately that of the condenser next preceding thereto, means to conduct the vapors resulting from reducing the pressure of the condensate to the said condenser next preceding, and a barometric down pipe to discharge the liquid condensate from the means for reducing the pressure on said condensate.

5. An apparatus for use in the Scholler saccharification process wherein dilute acids are percolated through cellulosic substances maintained under heat and pressure, to transfer the heat of a plurality of hot sugar wort fractions to water to be used in the percolation operation which comprises a plurality of expansion vessels arranged in parallel groups, each group comprising expansion vessels through which a fraction of the wort flows successively whereby the pressure and temperature of the said fraction are reduced in stages, a plurality of condensers, each condenser being operatively connected to expansion vessels of the same pressure in each of said groups to receive the vapors produced in said expansion vessels, and means to feed water to be used in the percolation operation through said condensers whereby said water is heated.

6. An apparatus for use in the Scholler saccharification process wherein dilute acids are percolated through cellulosic substances maintained under heat and pressure, to transfer the heat of a plurality of hot sugar wort fractions to water to be used in the percolation operation which comprises a plurality of expansion vessels arranged in parallel groups, each group comprising expansion vessels through which a fraction of the wort flows successively whereby the pressure and temperature of said fraction are reduced in stages, a plurality of condensers, each condenser being operatively connected to expansion vessels of the same pressure in each of said groups to receive the vapors produced in said expansion vessels, said condensers being positioned in order of the temperature of the vapors received thereby, and means to feed water to be used in the percolation operation successively through said condensers in the direction of the increasing temperatures whereby said water is progressively heated and the vapors in the respective condensers condensed.

7. An apparatus for use in the Scholler saccharification process wherein dilute acids are percolated through cellulosic substances maintained under heat and pressure, to transfer the heat of a plurality of hot sugar wort fractions to water to be used in the percolation operation which comprises a plurality of expansion vessels arranged in parallel groups, each group comprising expansion vessels through which a fraction of the wort flows successively whereby the pressure and temperature of said fraction are reduced in stages, a plurality of condensers, each condenser being operatively connected to expansion vessels of the same pressure in each of said groups to receive the vapors produced in said expansion vessels, said condensers being positioned in order of the temperature of the vapors received thereby, means to feed water to be used in the percolation operation through said condensers whereby said water is progressively heated and the vapors in the respective condensers condensed, means to reduce the pressure of the condensate of the condenser to approximately that of the condenser next preceding thereto, and means to conduct the said cooled condensate to the said condenser next preceding.

8. An apparatus for use in the Scholler saccharification process wherein dilute acids are percolated through cellulosic substances maintained under heat and pressure, to transfer the heat of hot sugar wort to water to be used in the percolation operation which comprises a plurality of expansion vessels through which the wort flows successively whereby the pressure and temperature of the wort are reduced in stages, a barometric down pipe for the discharge of the wort from the last expansion vessel, a plurality of condensers, each condenser being operatively connected to expansion vessels of the same pressure to receive the vapors produced in said expansion vessels, means to feed water to be used in the percolation operation through said condensers, whereby said water is heated, means to reduce the temperature of a condensate of a condenser to approximately that of the condenser next preceding, and means to conduct the said cooled condensate to said condenser next preceding.

9. In the Scholler saccharification process wherein dilute acids are percolated through cellulosic substances maintained under heat and pressure to yield hot sugar worts under pressure, the method of transferring the heat of the hot sugar wort to water used in the percolation operation which comprises reducing the pressure on the sugar wort in stages, separately conducting the vapors produced in each reduction stage to a separate condenser, and passing water to be used in the percolation treatment successively through each of said condensers in the direction of increasing temperature.

10. In the Scholler saccharification process wherein dilute acids are percolated through cellulosic substances maintained under heat and pressure to yield hot sugar worts under pressure, the method of transferring the heat of the hot sugar wort to the water used in the percolation operation which comprises reducing the pressure on the sugar wort in stages, separately conducting the vapors produced in each reduction stage to a separate condenser, passing water to be used in the percolation treatment successively through each of said condensers in the direction of increasing temperature, reducing the temperature of the condensate obtained in a condenser to that of the next preceding condenser, and conducting the thus cooled condensate to the next preceding condenser.

11. In the Scholler saccharification process wherein dilute acids are percolated through cellulosic substances maintained under heat and pressure to yield hot sugar worts under pressure, the method of transferring the heat of the hot sugar wort to the water used in the percolation operation which comprises reducing the pressure on the sugar wort in stages, separately conducting the vapors produced in each reduction stage to a separate condenser, passing water to be used in the percolation treatment successively through each of said condensers in the direction of increasing temperature, reducing the temperature of the condensate obtained in a condenser, by reduction in pressure thereof, to that of the next preceding condenser, and conducting the thus cooled condensate to the next preceding condenser.

12. In the Scholler saccharification process wherein dilute acids are percolated through cellulosic substances maintained under heat and pressure to yield hot sugar worts under pressure, the method of transferring the heat of a plurality of hot sugar worts to the water used in the percolation operation which comprises separately reducing the pressure on a plurality of sugar worts in stages to cool said worts to approximately the same temperature at said stages, conducting the vapors resulting from said pressure reductions to separate condensers in accordance with the temperature of said vapors, the vapors of substantially the same temperature being conducted to a common condenser, and passing water to be used in the percolation operation successively through each of said condensers in the direction of increasing temperature.

13. In the Scholler saccharification process wherein dilute acids are percolated through cellulosic substances maintained under heat and pressure to yield hot sugar worts under pressure, the method of transferring the heat of a plurality of hot sugar worts to the water used in the percolation operation which comprises separately reducing the pressure on a plurality of sugar worts in stages to cool said worts to approximately the same temperature at said stages, conducting the vapors resulting from said pressure reductions to separate condensers in accordance with the temperature of said vapors, the vapors of substantially the same temperature being conducted to a common condenser, passing water to be used in the percolation operation successively through each of said condensers in the direction of increasing temperature, reducing the temperature of a condensate obtained in a condenser to that of the next preceding condenser, and conducting the thus cooled condensate to the next preceding condenser.

MAX SEIDEL.